US007997528B2

(12) United States Patent
Lang (10) Patent No.: US 7,997,528 B2
(45) Date of Patent: Aug. 16, 2011

(54) REDUCING RUNWAY REQUIREMENT FOR AIRCRAFT (75) Inventor: James D. Lang, Carlsbad, CA (US)

(73) Assignee: Aereon Corporation, Princeton, NJ (US)

( * ) Notice: Subject to any disclaimer, the term of this patent is extended or adjusted under 35 U.S.C. 154(b) by 1086 days.

(21) Appl. No.: 11/653,729

(22) Filed: Jan. 16, 2007

(65) Prior Publication Data
US 2010/0252674 A1 Oct. 7, 2010

Related U.S. Application Data (60) Provisional application No. 60/759,947, filed on Jan. 18, 2006.

(51) Int. Cl.
*B64C 19/00* (2006.01)
(52) U.S. Cl. .................. 244/75.1; 244/199.1
(58) Field of Classification Search ............. 244/12.4, 244/199.1, 200.1, 204, 75.1, 90 R, 90 A, 244/36; 701/6–11
See application file for complete search history.

(56) References Cited

U.S. PATENT DOCUMENTS

| 3,831,885 | A | * | 8/1974 | Kasper | 244/199.1 |
| 4,234,142 | A | * | 11/1980 | Yost et al. | 701/6 |
| 4,293,110 | A | * | 10/1981 | Middleton et al. | 244/199.1 |
| 4,485,992 | A | * | 12/1984 | Rao | 244/90 R |
| 4,896,846 | A | * | 1/1990 | Strom | 244/75.1 |
| 5,094,411 | A | * | 3/1992 | Rao | 244/214 |
| 5,255,881 | A | * | 10/1993 | Rao | 244/199.1 |
| 5,598,990 | A | * | 2/1997 | Farokhi et al. | 244/200.1 |
| 5,772,155 | A | * | 6/1998 | Nowak | 244/200.1 |
| 5,984,229 | A | * | 11/1999 | Hollowell et al. | 244/12.4 |
| 6,123,296 | A | * | 9/2000 | Mangalam | 244/204 |
| 6,246,929 | B1 | * | 6/2001 | Kaloust | 701/11 |
| 6,892,982 | B2 | * | 5/2005 | Clark | 244/36 |
| 7,070,144 | B1 | * | 7/2006 | DiCocco et al. | 244/3.21 |

OTHER PUBLICATIONS

Wilson, X-31 Finds a Shorter Path to Success, Aerospace America 2003 6pages http://www.aiaa.org/Aerospace/Article.cfm?issuetocid=392&ArchiveIssueID=41.*
X-31 Enhanced Fighter Maneuverability Demonstrator, testing ended Apr. 29, 2003 http://www.globalsecurity.org/military/systems/aircraft/x-31.htm.*
X-31 Makes ESTOL landing on virtual runway Nov. 22, 2002 http://www.navy.mil/search/display.asp?story_id=4709.*
Siuru, jr. Supermaneuverability Airpower Journal Spring 1988 http://www.airpower.maxwell.af.mil/airchronicles/apj/apj88/spr88/siruru.html.*

* cited by examiner

*Primary Examiner* — Galen Barefoot
(74) *Attorney, Agent, or Firm* — Howson & Howson LLP (57) ABSTRACT

Runway length requirement for take-off and landing of an aircraft is reduced by taking advantage of dynamic lift overshoot, and in some cases, dynamic stall. In take-off and landing, the angle of attack is rapidly increased so that the lift coefficient exceeds the maximum predicted by the steady flow lift curve. By increasing the angle of attack at an appropriate rate, the increased lift coefficient can be maintained, without loss of control, until the aircraft touches down in the case of a landing, or until the aircraft can begin a normal climb, in the case of take-off. A low aspect ratio lifting body is preferred because of its more gradual stall behavior, and the potential to use dynamic stall for further deceleration before touchdown. Vortex fences can be oscillated to delay the onset of stall, and, in cruise, to energize the boundary-layer and reduce drag and/or control roll and/or yaw.

21 Claims, 6 Drawing Sheets

REDUCING RUNWAY REQUIREMENT FOR AIRCRAFT

CROSS-REFERENCE TO RELATED APPLICATION

This application claims priority on the basis of provisional patent application Ser. No. 60/759,947, filed Jan. 18, 2006.

STATEMENT OF GOVERNMENT INTEREST

This invention was made with Government support, and the Government has certain rights in the invention.

FIELD OF THE INVENTION

The invention relates to aircraft, and more particularly to methods for reducing the runway length requirement for take-off and landing of an aircraft. The invention has utility particularly in remotely controlled, or autonomously operated, unmanned aircraft intended for launch from, and recovery on, a maritime vessel. However, the method according to the invention can be utilized both in manned aircraft, and in land-based aircraft.

BACKGROUND OF THE INVENTION

In take-off of a conventional aircraft, the aircraft accelerates along a runway until it reaches take-off speed. Then, by operation of control surfaces (usually elevators) the angle of attack of the principal airfoil surface (usually the wings) is increased in order to increase lift to a value exceeding the aircraft's weight. The attitude typically is maintained during climb, whereupon the angle of attack is typically decreased for level flight at a cruising altitude.

In landing, with the engine throttled back so that the aircraft descends as it approaches the runway, the angle of attack is increased slightly to increase lift so that the aircraft can touch down gently and brake to a stop.

In both cases, the angle of attack of the aircraft is carefully limited in order to avoid stall, which would result in loss of control, and generally, the aircraft is controlled so that the lift coefficient is limited to a fraction of the maximum lift coefficient, based on the lift curve which characterizes the airfoil surface in steady flow, taking into account trim, flap settings, etc. Typically, the lift coefficient is limited to about 80% of the maximum lift coefficient.

In conventional take-off and landing, the ground roll during take-off is relatively long, the ground roll following touchdown is also relatively long. These long ground roll distances require long runways, and have led to the development of various techniques for short take-off and landing (STOL), including high lift devices, rocket boosters, tilting engines, etc.

An object of this invention is to achieve short take off and landing performance in an aircraft without the need for expensive attachments and modifications. The invention takes advantage of a phenomenon known as "dynamic lift overshoot," in which, as the angle of attack of an airfoil is continuously increased, the lift coefficient $C_L$ can, for a short time, exceed $C_{Lmax}$, the peak value of the lift curve for the airfoil under steady flow conditions. Dynamic lift overshoot can be predicted and controlled in such a way as to produce increased lift while avoiding stall and departure. Thus, controlled use of dynamic lift overshoot can significantly reduce take-off and landing speeds, and shorten runway length requirements.

BRIEF SUMMARY OF THE INVENTION

Briefly, in accordance with the invention, the runway length requirement for the take-off or landing of an aircraft can be reduced by increasing the lift coefficient of the aircraft to a level exceeding the steady-flow stall value while the aircraft is taking off or landing, whereby the lift coefficient of the aircraft exceeds the maximum lift coefficient predicted by the steady flow lift curve for the aircraft.

The step of increasing the lift coefficient of the aircraft to a level exceeding the steady-flow stall value can be carried out either by increasing the angle of attack of the wings, increasing the flap angle, or both.

The time rate of change of the increase in the angle of attack and/or the flap angle is controlled to achieve the desired takeoff or landing distance. Normally, this can be done by using moderate rates-of-change of angle of attack and/or flap angle. Most control systems can achieve the desired rates without the need for control effector changes. The upper limit to $\dot{\alpha}$, the rate of change of angle of attack, is set only by what the aircraft's controls can achieve. At maximum elevator deflection the resulting moment acts to accelerate $\alpha$. The maximum rate, in almost any aircraft, will be sufficient to achieve lift overshoot.

During dynamic lift overshoot, when the lift coefficient of the aircraft closely approaches the maximum, vortex energizers may be activated to increase the overshoot and thus delay the onset of stall.

Preferably, the onset of stall is sensed automatically by means of sensors, and one or the other of two actions occurs. The lift coefficient of the aircraft may be decreased, from a level too close to the dynamic stall value (e.g. 90% of $C_{Lmax, dynamic}$) to a level well below the dynamic stall value (e.g., 80% of the "dynamic stall" value of $C_{Lmax}$), in response to a signal provided by the sensors. Alternatively, the lift overshoot can be increased by activating the vortex energizing system in response to the signal provided by the sensors. Both approaches are responsive to both the attitude and accelerations of the aircraft. The lift coefficient of the aircraft can be decreased by actuation of a control surface, or the vortex energizer can be activated in response to a signal provided by the sensors, and preferably with the aid of an on-board computer responsive to the sensors.

In a preferred embodiment, the aircraft is a lifting body, having a delta-shaped planform, a narrow nose, and a wide trailing edge, substantially the entire body of the aircraft serving as an airfoil.

More specifically, in the case of take-off, the runway length requirement is reduced by the steps of generating lift by causing the aircraft to accelerate to take-off speed while maintaining the lift coefficient at a level below the steady flow stall value, thereafter increasing the lift coefficient to a level exceeding the steady flow stall value, causing the aircraft to climb while the lift exceeds the weight, and, during the climb, decreasing the lift coefficient to a level below the steady flow stall value before loss of control occurs. Similarly, in the case of landing, the runway length requirement is reduced by the steps of maintaining the lift coefficient of the aircraft at a level below the steady flow stall value during approach to landing, thereafter increasing the lift coefficient to a level exceeding the steady flow stall value, then touching wheels down on the runway, and, either shortly before, simultaneously with, or shortly after touchdown, decreasing the lift coefficient to a level below the steady flow stall value. Decreasing the attitude of the aircraft just before touchdown is preferable in the case of conventional landing gear.

Other objects, details and advantages of the invention will be apparent from the following detailed description when read in conjunction with the drawings.

DETAILED DESCRIPTION OF THE PREFERRED EMBODIMENT

As stated previously, the invention takes advantage of "dynamic lift overshoot," where the lift coefficient $C_L$ of the aircraft exceed the peak value, $C_{Lmax}$, of the lift curve for steady flow.

A theory explaining how flowfield acceleration and other contributors to lift affect lift overshoot focuses on normal force rather than lift, since separation and stall are suppressed during the "pitch-up" before $C_{Nmax}$, the peak value of the normal force coefficient, is reached, and the normal force can increase even at very large angles of attack. The theory is based on the assumption that rate-of-change of normal force is the key parameter in determining stall delay.

Under this theory, predictions of lift overshoot are related to normal force directly by the formula:

$$\Delta C_{Nmax} \cong k_1 C_{N\alpha} \left[ \left( \frac{\dot{\alpha} c}{2V} \right) + \sum k_{2i} \left( \frac{\dot{\delta}_i c}{2V} \right) + k_3 \alpha \left( \frac{\dot{V} c}{2V^2} \right) \right]^{k_4}$$

where:

$\Delta C_{Nmax} = C_{Nmax, dynamic} - C_{Nmax, steady}$ c is the mean aerodynamic chord.

$k_1$ correlates directly with the constants of proportionality from 4.0 to 9.0, by which $\Delta \alpha_{stall}$ ranges from 4.0k to 9.0k. Flight tests have yielded a value of 6.2 for $k_1$, which falls approximately midway in the range from 4.0 and 9.0 for the linear models.

$\dot{\alpha}$ is the actual rate-of-change of angle of attack,

V is the free-stream velocity, $\dot{V}$ is the time rate-of-change of free stream velocity.

The terms in the summation represent the rate effects of flaps and other control effectors to normal force buildup, the $k_{2i}$ terms representing the ratio of each contributor's aerodynamic force derivative to $C_{N\alpha}$. For example, $k_{21}$ and $\dot{\delta}_{12}$ relate to flap lift effectiveness and flap-angle time rate-of-change; $k_{22}$ and $\dot{\delta}_{22}$ relate to left elevon lift effectiveness and left elevon angle time rate-of-change. Similarly, $k_{23}$ and $\dot{\delta}_{23}$ relate to right elevon lift effectiveness and right elevon angle time rate-of-change. $k_{24}$ and $\dot{\delta}_{24}$ relate to vortex fence lift effectiveness and vortex fence angle time rate-of-change.

$k_3$ relates to the relative contribution of flowfield acceleration or deceleration. If related to the time rate of change of circulation, $k_3$ would be 1.0. If related to the time rate-of-change of normal force, $k_3$ would be 2.0. If related to the time rate-of-change of normal power, (i.e., NV), $k_3$ would be 3.0. The actual value of $k_3$ should be found from flight test data.

$k_4$ should also be found from flight test data. However, the applicant has been it to be about 1.0, thus allowing a simplified linear superposition of effects.

The complete term in square brackets is the "effective" non-dimensional rate-of-change of angle-of-attack. The formula assumes that the time rates-of-change $\dot{\alpha}$, $\dot{V}$ and $\dot{\delta}$ are quasi-steady (i.e., slowly time-varying).

Figure 1:
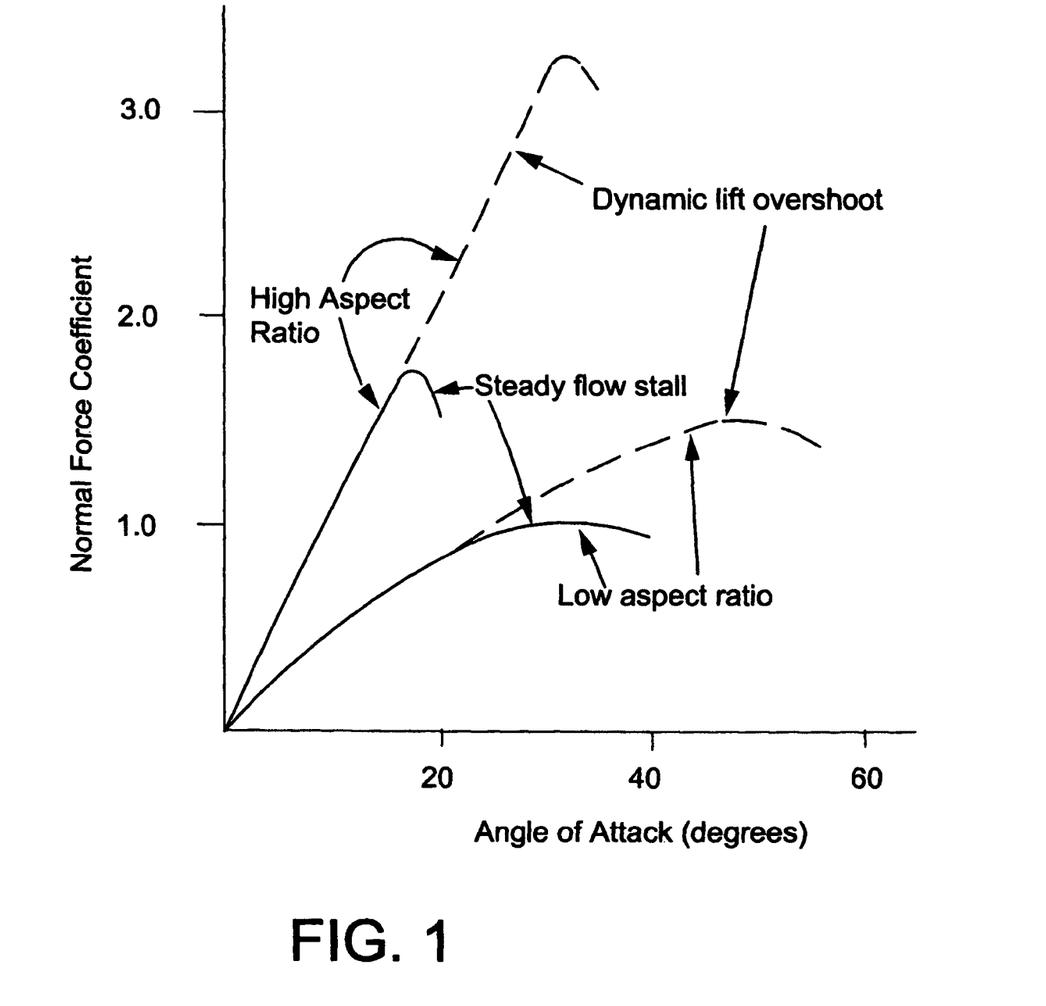
FIG. 1 is a graph using notional data to illustrate dynamic lift overshoot in both high aspect ratio and low aspect ratio aircraft.

Dynamic lift behavior is different for a high aspect ratio aircraft than for an aircraft having a low aspect ratio, as seen in FIG. 1. There, the normal force coefficients $C_N$ are plotted against angle of attack for identical values of k, the non-dimensional rate of change of angle-of-attack. The solid lines represent steady flow where k≅0. The broken lines show dynamic lift overshoots where k=0.045, as examples. As shown in FIG. 1, for a high aspect ratio airfoil, the curve for $C_N$ under steady flow conditions rises steeply, with a sharp peak at a value, for that example, of approximately 1.7 for $C_N$ at a 16° angle of attack. With overshoot, $C_N$ for the high aspect ratio airfoil can reach approximately 3.3 at an attack angle of about 33°. For the low aspect ratio airfoil, the curve for $C_N$ under steady flow conditions rises more gradually, with a peak value of approximately 1.0 for $C_N$ at a 30° angle of attack. With overshoot, however, $C_N$ for the low aspect ratio airfoil can reach approximately 1.6 at an attack angle of about 44°.

In accordance with the invention, landing and take-off maneuvers are pre-planned and controlled normally in order to take advantage of lift overshoot while avoiding dynamic stall. However, for low aspect ratio aircraft configurations that are stable and controllable during dynamic stall, in accordance with the invention, landing and take-off maneuvers may be pre-planned and controlled in order to take advantage of lift overshoot and to include benefits of dynamic stall.

There are two stall types that describe the potential consequences of a dynamic stall, and they are related to the characteristics observed in quasi-steady flow.

For high aspect ratio unswept wings, stall occurs across the span abruptly, usually when the spanwise vortex "bubble" grows to a size that cannot be maintained. Often, in a manner similar to what is observed in retreating blade stall in a helicopter rotor, the spanwise vortex bubble is convected downstream at a fraction of the free stream speed, with a resultant nose-down pitching moment on the aircraft. The dynamic lift-induced vortex bubble is washed off the wing within a few (typically three) chordlengths of travel, resulting in a sudden stall. When this happens asymmetrically, a violent departure from controlled symmetrical flight can occur.

For low aspect ratio, or highly swept, wings, the vortex system develops primarily chordwise rather than spanwise. The stall mechanism is related primarily to vortex bursting, which correlates to excessive swirl near the (chordwise) vortex core. When stall is initiated (because the rate at which vorticity is added is not sufficient to dominate viscous effects), and the flow field begins to relax toward a stalled steady-flow condition, the aircraft can travel many chordlengths (as many as forty or more) before vortex bursting has moved forward enough to affect aircraft loads. Bursting is usually followed by a nose-up pitching moment.

Hybrid combinations, with mixed dynamic stall behavior can be found between these two extremes. For example, where a relatively straight, high aspect ratio, wing, and a highly swept strake configuration are found together, the steady flow stall behavior is reached after a dynamic lift overshoot and dynamic stall, through a complex interaction between the two stall types.

Figure 2:
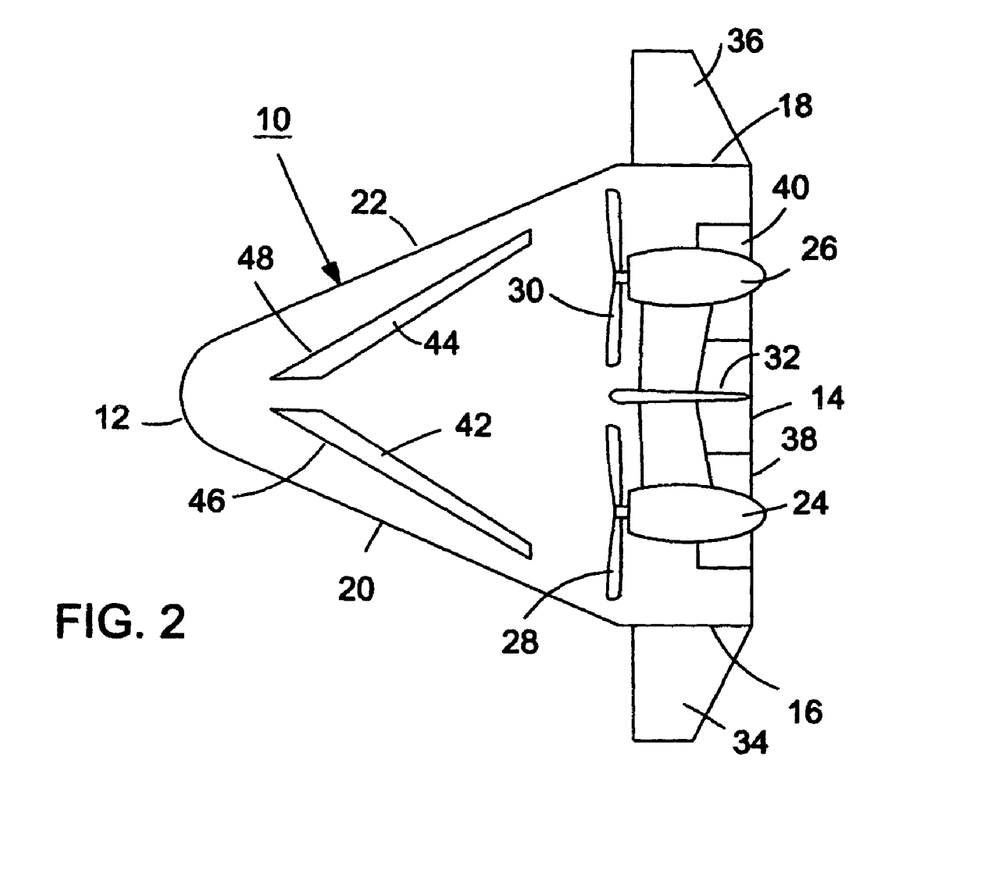
FIG. 2 is a top plan view of an unmanned aircraft suitable for take-off and landing in accordance with the method of the invention.
Figure 3:
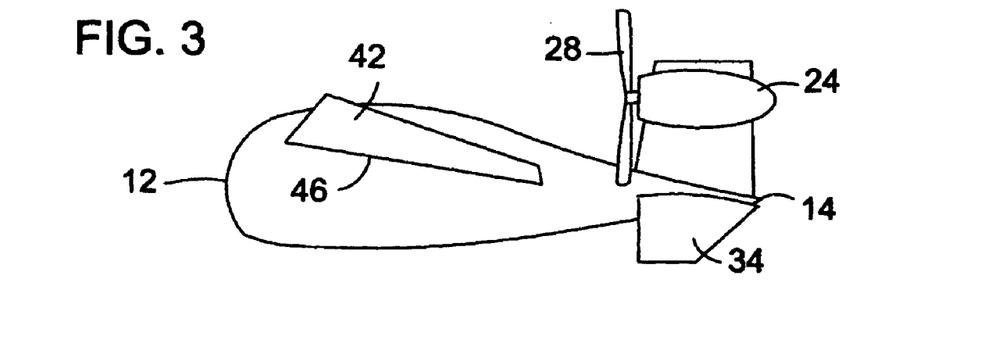
FIG. 3 is a side elevational view of the unmanned aircraft in FIG. 2.

The aircraft shown in FIGS. 2 and 3 is an example of an aircraft suitable for take-off and landing by taking advantage of dynamic lift overshoot as well as dynamic stall. The aircraft is a low aspect ratio lifting body aircraft of the type described in U.S. Pat. Nos. 4,149,688, 4,896,160 and 5,034,751, the disclosures of which are here incorporated by reference. Briefly, a lifting body aircraft is an aircraft having a substantially continuous airfoil surface from one end of its span to the other, and lacking a well-defined transition between wing and fuselage. Lifting bodies are characterized by good longitudinal static stability, possess favorable stall characteristics, and are capable of relatively high cruising speeds and relatively low landing speeds.

The aircraft 10, shown in FIGS. 2 and 3, is characterized by a substantially triangular or delta-shaped planform, a nose 12 at one corner of the triangle, and a trailing edge 14 opposite the nose and extending between a pair of lateral extremities 16 and 18, each at one of the remaining corners of the triangle. The sides 20 and 22 of the triangle which meet at the nose form portions of the leading edge, and vertical longitudinal sections of the lifting body are thick airfoil sections which may be either cambered as in FIG. 3, or uncambered. The hull of the lifting body is preferably substantially symmetrical about a central vertical plane extending from its nose 12 to a mid-point on the trailing edge 14. The transverse cross-sections throughout substantially all of the length of the lifting body are substantially elliptical on either side of the central vertical plane. From the nose to the point of maximum vertical dimension in the central vertical plane, the elliptical cross-sections become progressively higher and progressively wider, with width increasing more rapidly than height. From the point of maximum vertical dimension toward the trailing edge, however, the elliptical cross-sections continue to increase progressively in width, but decrease progressively in height. Various deviations from the above-described relationships may exist in a lifting body, for example, with respect to the configuration of the nose and lateral extremities.

Propulsion may be achieved by any of various means. In this case, as in U.S. Pat. No. 4,149,688, engines 24 and 26, with propellers 28 and 30, are supported on a centrally located vertical stabilizer 32. Outboard control surfaces 34 and 36 are provided at both ends of the trailing edge, and split flaps 38 and 40 are built into the trailing edge.

Vortex fences 42 and 44 are provided on both sides of the leading edge. Although they have the appearance of conventional spoilers, the vortex fences can be deployed by rotating them upward and forward, about hinge lines 46 and 48 on their forward edges, from a flush position to a fully opened position, typically at an angle of about 135 degrees relative to the chordplane. At any deployed position, energizers (not shown) may be used to oscillate the vortex fences about their hinge lines at small amplitudes, e.g., 5 degrees, at frequencies such that they place up to about four wavelengths of energized flow over the surface of the lifting body. Preferably, the two vortex fences can be deployed and oscillated independently of each other in order to affect the flow field on one side of the lifting body separately from the flow field on the other side.

The vortex fences preserve flow symmetry in steady flow with sideslip, generate nose-up pitching moments, and, by the operation of the energizers to oscillate the vortex fences, delay the onset of stall by adding vorticity to strengthen the vortex system on one or both sides of the lifting body. Small deflections of the fences, that may be coupled with operation of the energizers, can be used to energize the upper-surface boundary-layer to delay large-scale separation and, during cruise flight, to decrease aircraft drag or to achieve asymmetric lift or drag for roll or yaw control.

Figure 4:
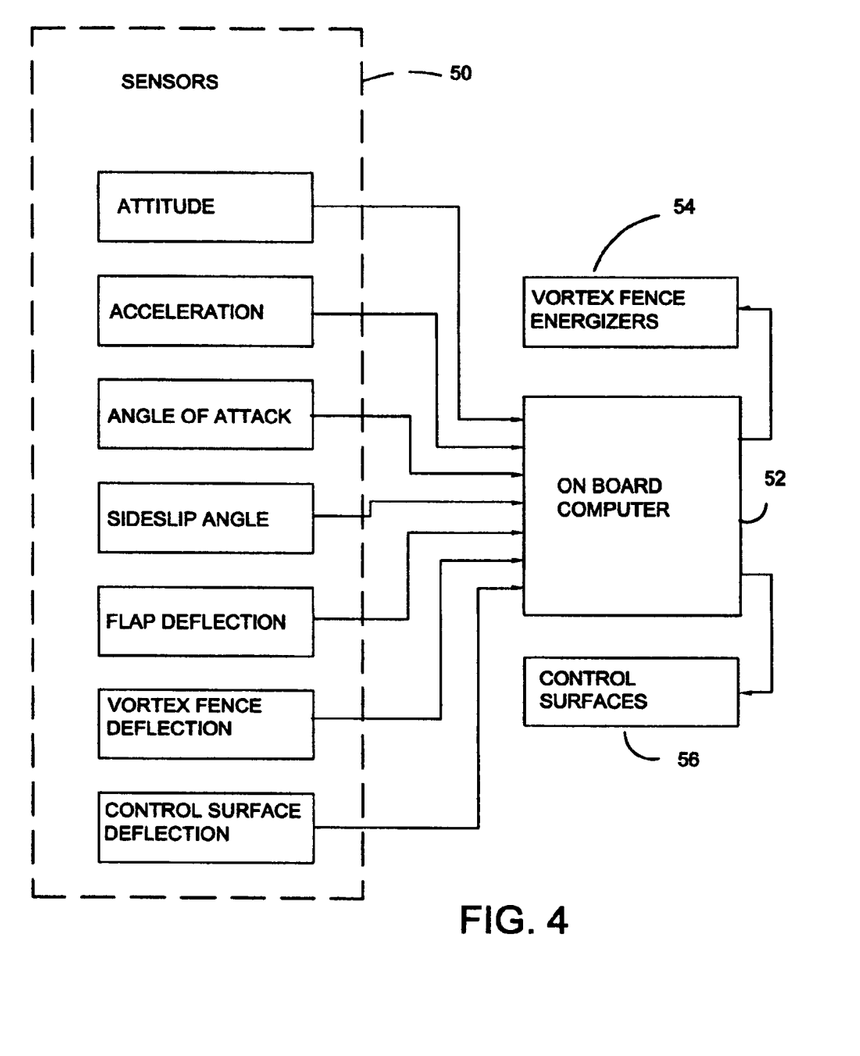
FIG. 4 is a schematic diagram of an aircraft control system for use in implementing dynamic lift overshoot.

As shown in FIG. 4, sensors 50 are provided on the aircraft to provide information to an on-board computer 52 concerning aircraft attitude, acceleration, angle of attack, sideslip angle, and deflections of flaps, control surfaces, and the vortex fences. From the information provided by the sensors, the computer derives an estimate of the normal force coefficient acting on the lifting body during flight. When utilizing dynamic lift overshoot during landing or taking off, the estimate of the normal force coefficient is compared with the estimated and planned values of $C_{Nmax}$. Control surfaces 56 are operated to increase the angle of attack at a rate such that the planned dynamic lift overshoot is achieved. If the estimated normal force coefficient reaches about 90% of the estimated value of $C_{Nmax}$, the vortex fence energizers 54 may be actuated to increase the margin of safety and delay stall. For low aspect ratio configurations, when use of dynamic stall is intended, the vortex energizers may be used for additional control to augment normal control effectors during dynamic stall.

A key goal, for a given aircraft configuration, is to predict the magnitude of the dynamic lift and stall angle-of-attack overshoots, and, if use of dynamic stall is planned, to predict its effect before touchdown.

This starts by having the best available data on the quasi-steady flow lift and drag characteristics up to and beyond the stall angle of attack. It is helpful to resolve the lift and drag data ($C_L$ and $C_D$) into normal and axial force components ($C_N$ and $C_A$), since the dynamic lift effects relate most directly to normal force and circulation changes. Wind-tunnel or flight test data for conventional slow rates-of-change of angle of attack (e.g., from wind-up turns) may be used as a foundation for the database. The database should include the individual effects of control surface and high lift device deflections. Key non-linear effects, such as loss-of-control angle of attack limits and stall, must be well represented.

A next step is to use the database to predict the values of $C_{Lmax}$ and $C_{Nmax}$ and $V_{stall}$ for a conventional landing configuration with conventional settings for the flaps and other high-lift devices. Then approach and touchdown speeds are determined. For example the approach and touchdown speeds can be 1.2 and 1.1 times $V_{stall}$, respectively, for military aircraft, or 1.3 and 1.15 times $V_{stall}$ for commercial aircraft. Corresponding lift coefficients and angles of attack should also be determined. Landing ground roll may then be calculated.

If landing ground roll is constrained to a smaller value than the calculated landing ground roll, the smaller value may be achieved by the use of dynamic lift. First the touchdown speed that will achieve the required ground roll is calculated. Then the associated touchdown value of $C_L$ (i.e., $C_{LTD}$) is calculated, and the new required $C_{Lmax}$ is determined. For example, $C_{Lmax}=(1.1)^2 \cdot C_{LTD}$ for military aircraft. This becomes the dynamic lift "target". From the formula, it follows that the velocity at touchdown is 1.1 times the stall velocity.

Next, the required dynamic normal force overshoot required to achieve the lift overshoot must be defined. The overshoot in the normal force coefficient $C_N$ is $\Delta C_{Nmax}$, which is equal to $C_{Nmaxdynamic} - C_{Nmaxsteady}$. The dynamic lift overshoot $\Delta C_{Lmax}$ is similarly defined. A first estimate of overshoot may be found from $\Delta C_{Nmax} = \Delta C_{Lmax} \cos \alpha$, with $\alpha$ being the angle of attack taken from the quasi-steady $C_L$ vs $\alpha$ curve at $C_{Lmax}$. Next, the combinations of rates-of-change of $\alpha$ and other contributors to lift overshoot that result in the desired CNmax should be investigated, using the relationship:

$$\Delta C_{Nmax} \cong k_1 C_{N\alpha}\left[\left(\frac{\dot{\alpha}c}{2V}\right) + \sum k_{2_i}\left(\frac{\dot{\delta}_i c}{2V}\right) + k_3 \alpha\left(\frac{\dot{V}c}{2V^2}\right)\right]^{k_4}$$

k1 is preferably about 6.2, based on test results. The above relationship accounts for the effect of flowfield acceleration (takeoff) or deceleration (landing). In some cases, this effect can be large.

Iteration of the previous two steps until convergence will result in a plan to use angle of attack rate of change, and control effector rates-of-change, to overshoot $C_{Lmax}$ and $C_{Nmax}$ and achieve a reduced ground roll.

For any given aircraft configuration, initial attempts to use dynamic lift overshoot should be carried out in flight tests at altitude. The high $\dot{\alpha}$ (time rate of change of angle of attack) envelope should be expanded carefully and explored fully. In that way, as with conventional flight testing, a more exact determination can be made of the full-scale details of dynamic lift overshoot for a given configuration. Furthermore, the feasibility of using initial phases of dynamic stall, can be explored. If use of dynamic stall is planned, the steps described in the preceding five paragraphs must be modified by using a database expanded to include dynamic stall data from flight tests at altitude.

A factor of safety is utilized just as in the case of steady flow. A factor of safety may be built into the landing methodology in two ways when dynamic stall is not planned to be used. Using military criteria, each landing is planned so that the average value of $C_L$ is about 69% of $C_{Lmax}$ while on the approach to landing. The touchdown values of $C_L$ and $C_N$ should be about 83% of the predicted $C_{Lmax}$ and $C_{Nmax}$ values. The average value of $C_L$ is an average for both wings (or in the case of a lifting body, both sides). Differences in $C_L$ and $C_{Lmax}$ for the wings come about as a result of sideslip and/or yaw rates and roll rates, and differential control surface deflections. Therefore, the values of $C_L$ and $C_{Lmax}$ are estimated independently for the two wings. If the margin for one wing becomes small, i.e., the value of $C_L$ approached 90% of $C_{Lmax}$, the appropriate vortex energizer is used to increase $C_{Lmax}$ for that wing, thus raising the margin.

The unsteady aerodynamic effects that result in delay of stall and provide dynamic lift overshoot also suppress loss-of-control aerodynamic forces and moments associated with asymmetric separations. Flight test experiments have shown that, when dynamic stall was experienced, there is a significant time delay associated with flowfield relaxation to a steady state condition. An aircraft can travel many chordlengths without any loss of control.

This provides the margin of safety when use of dynamic stall is planned.

To refine the landing maneuver for a given aircraft, a good six degree of freedom simulation should be used to "shape" the angle of attack and trajectory time history to achieve touchdown at a planned point with planned airspeed and angle of attack rates. Attitude and rate feedback control, throttle control, and coupling with ILS, MLS or other landing systems can help achieve the planned trajectory with desired control effector, flap, and angle of attack rates-of-change. GPS guidance and a ground-proximity sensor will be needed for autonomous dynamic lift landing operations.

During the "flare" maneuver associated with landing, it is important to appreciate the utility of high angle of attack values and the associated drag as well as lift overshoots. Increased aircraft drag is put to work to decelerate the aircraft even after the flight path has been curved from an approach angle to near level. Aerodynamic braking is thus a key feature of landings utilizing dynamic lift overshoot. With the proper use of angle of attack, time rate-of-change of angle of attack, and throttle control, reliable, repeatable, and predictable short landings can be achieved routinely.

Take-off maneuvers using dynamic lift require feedback control and trajectory shaping similar to landing maneuvers, but with somewhat less concern over ground proximity. Therefore, less precision is required in following a prescribed trajectory. Takeoff thrust-to-weight ratio is the key performance parameter. With low thrust-to-weight values, the rapid drag buildup after rotation may force takeoff velocities, hence ground rolls, to high values near those for conventional take-off. The most important consideration unique to take-off involves lowering the lift coefficient, in the climbout immediately after take-off, to a value below steady-flow stall in order to prevent departure from controlled flight and to decrease drag so that the aircraft can accelerate to normal climb speed. Trajectory shaping to refine this maneuver can be done readily in simulation. During flight, values of $C_L$, $C_N$, $C_{Lmax}$ and $C_{Nmax}$ are estimated, and stall margins are maintained as described above in the landing example. Conventional inertial and altitude sensors suffice for takeoff maneuvers. However, the use of the global positioning system (GPS) is also preferred.

The invention is particularly useful in reducing the landing and take-off distances for ship-based unmanned aircraft.

Figure 5:
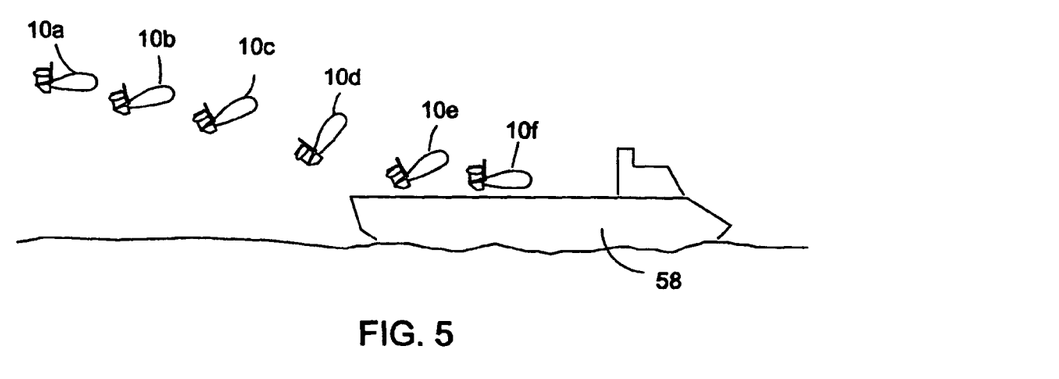
FIG. 5 is a schematic elevational view illustrating, by way of sequential snapshots, the manner in which an aircraft lands on the deck of a maritime vessel, following the method in accordance with the invention.

FIG. 5 shows an aircraft corresponding to the aircraft in FIGS. 2 and 3 approaching the deck of a ship 58. The ship can be stationary, but is preferably moving into the wind. The aircraft is shown approaching the deck in several stages to illustrate a landing maneuver that uses dynamic lift overshoot, but not dynamic stall. In stage 10a, the aircraft is shown making a conventional approach, with flaps deployed, and at an angle of attack well below the angle at which stall would occur. In stage 10b, the aircraft begins to pitch up, and the angle of attack increases continuously at a controlled rate, as illustrated by stages 10b, 10c and 10d until just before touchdown, at stage 10e. It is at stage 10b that the angle of attack begins to exceed the stall angle predicted by the steady flow lift curve. As the angle of attack is continuously increased in stages 10b through 10c, the lift coefficient $C_L$ exceeds the steady flow maximum $C_{Lmax,steady}$ and approaches the dynamic maximum $C_{Lmax,dynamic}$. At the same time, without loss of control, the approach speed is greatly reduced, and consequently the landing roll distance is reduced, and the aircraft comes to a stop at stage 10f. At a suitable point, at stage 10d, for example, vortex fences, if present, may be oscillated by vortex energizers, to preserve flow symmetry, and delay the onset of stall. Plural vortex energizers can be used. For example, vortex energizers can be provided in parallel rows and operated independently or in a predetermined sequence. Moreover, the vortex energizers can be controlled by feedback and responsive to the leading edge vortex or to other parameters.

Figure 6:
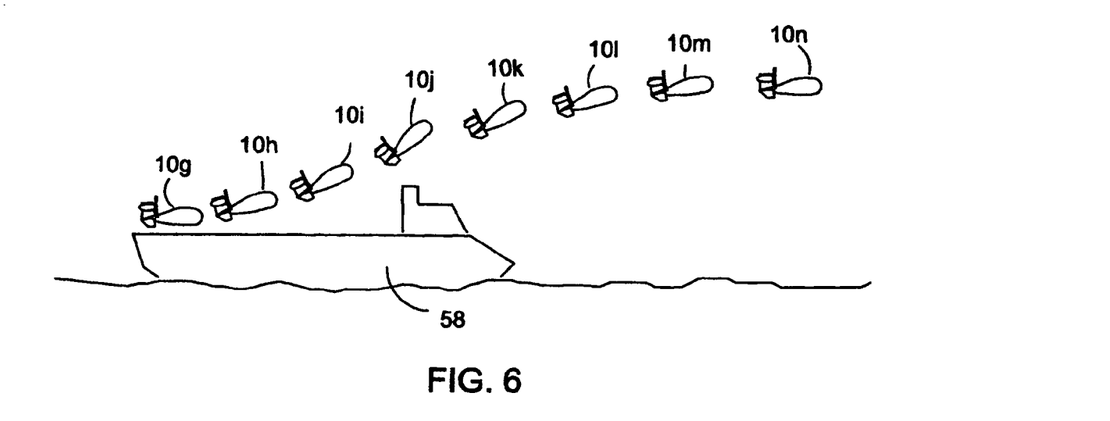
FIG. 6 is a schematic elevational view illustrating, by way of sequential snapshots, the manner in which an aircraft takes off from the deck of a maritime vessel, following the method in accordance with the invention.

In FIG. 6, the aircraft is shown taking off from ship 58. Here, after a relatively short roll beginning at stage 10g a rapid upward pitch is initiated at stage 10h. The angle of attack exceeds the steady flow stall value at a point between stages 10h and 10i, and the lift coefficient $C_L$ exceeds the steady flow maximum, causing the aircraft to take off. The angle of attack exceeds the stall value through stage 10j, after which the controls are operated to cause the aircraft to level off, and to accelerate to climb speed at stage 10n.

Figure 7:
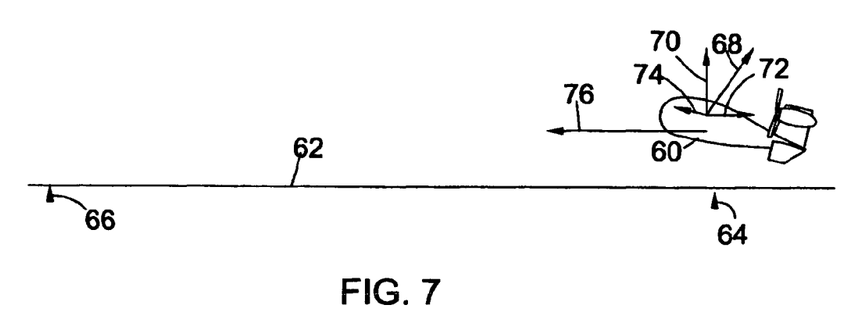
FIG. 7 is a schematic elevational view illustrating force and velocity vectors, and ground roll distance for a conventional landing.
Figure 8:
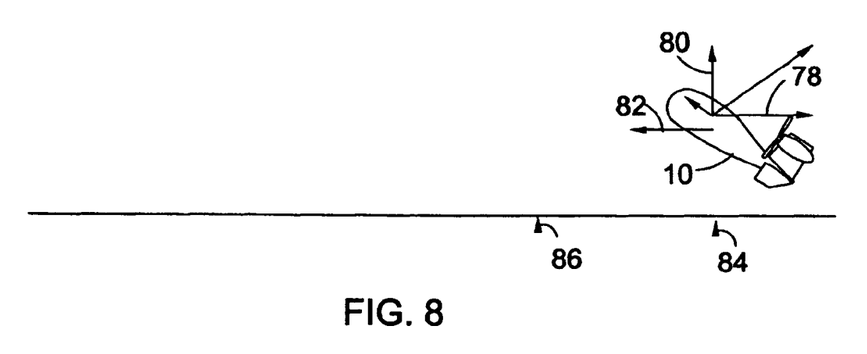
FIG. 8 is a schematic elevational view illustrating force and velocity vectors, and ground roll distance for a landing according to the invention.

A comparison of FIGS. 7 and 8 will demonstrate the differences between a conventional landing and a landing utilizing dynamic lift overshoot. In FIG. 7, aircraft 60 is shown approaching a landing strip 62. Just before touchdown, the aircraft is controlled so that it flares gently, and the flare is maintained until touchdown at point 64. Following touchdown, the aircraft brakes to a stop at point 66. Just before, and at, touchdown, the angle between the aerodynamic force and lift vectors 68 and 70 is relatively small, and the drag and thrust vectors, 72 and 74, are nearly aligned, and of comparable magnitude although in opposite directions. At touchdown, the aircraft has a velocity represented by vector 76. In contrast, in FIG. 8, shortly before touchdown, the aircraft 10 is caused to pitch up rapidly. Here, the magnitude of the drag, represented by vector 78, is significantly larger than the magnitude of the drag vector 72 in FIG. 7, while the lift, represented by vector 80, is comparable to lift vector 70 in FIG. 7. The result is that the velocity of aircraft 10 at touchdown, represented by vector 82, is much smaller than the velocity 76 in FIG. 7, and the roll distance, between touchdown at point 84 and stop at point 86 is substantially less than the roll distance in FIG. 7.

Figure 9:
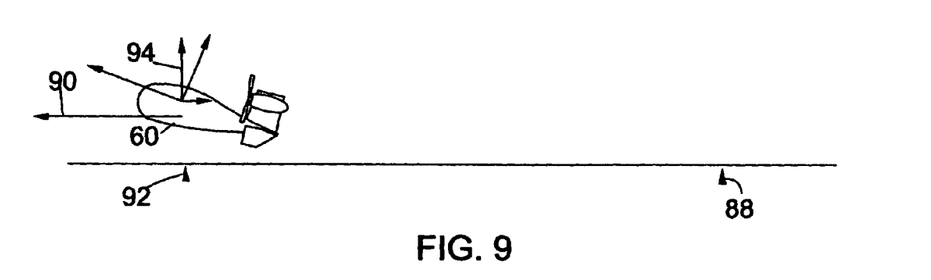
FIG. 9 is a schematic elevational view illustrating force and velocity vectors, and ground roll distance for a conventional take-off.
Figure 10:
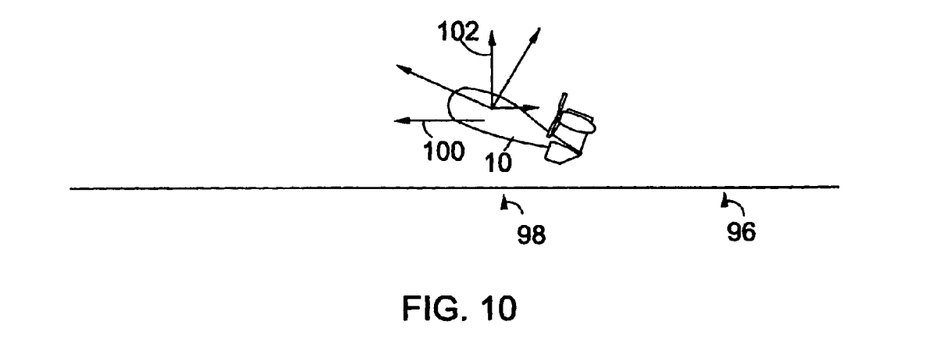
FIG. 10 is a schematic elevational view illustrating force and velocity vectors, and ground roll distance for a take-off according to the invention.

FIGS. 9 and 10 illustrate the differences between a conventional take-off and a take-off utilizing dynamic lift overshoot. As shown in FIG. 9, aircraft 60 has rolled from a starting point 88, reaching a take-off velocity represented by vector 90 at point 92, where, by rotation to a take-off attitude, the aircraft departs the runway and begins to climb while maintaining the take-off attitude. The magnitude of the lift at take-off and during initial climb is represented by vector 94 In FIG. 10, aircraft 10 is shown having rolled through the distance from starting point 96 to a take-off point 98, reaching a velocity represented by vector 100, which, because of the shorter ground roll distance, is significantly less than velocity 90. However, at the take-off point, the aircraft is caused to pitch up rapidly, so that its angle of attack exceeds the steady flow stall angle. The rapid increase in the angle of attack results in dynamic lift overshoot, in which the magnitude of the lift vector 102 corresponds to the magnitude of lift vector 94 in FIG. 9. The result is that the aircraft is able to leave the runway within a ground roll distance much shorter than that for a conventional take-off. During the pitch-up and initial climbout, drag will build up and speed will start to decrease. Therefore, soon after liftoff, and after the initial climb has been set up, the angle of attack must be lowered in order to decrease drag and allow the aircraft to accelerate again. This is done quickly so that the aircraft does not lose significant altitude. Then the aircraft can accelerate to its normal climb speed and continue the climbout. Thus, by the use of dynamic lift overshoot, take-off can be achieved with a greatly reduced ground roll.

Reduced takeoff and landing distances can enable fixed-wing operations from small ships and airstrips with the potential to eliminate launching or arresting devices. When launching or arresting devices are used, the reduced takeoff speed will require less energy addition, and the reduced landing speed will greatly reduce the workload on those devices, and thus significantly extend their life and reduce maintenance costs.

Low aspect ratio aircraft, such as the lifting body, are especially suitable for take-off and landing maneuvers in accordance with the invention because of their more gradual stall behavior and the potential to use dynamic stall for further deceleration before touchdown. However, the invention is applicable to winged aircraft including aircraft having a relatively high aspect ratio. Various modifications can be made to the aircraft described. For example, because a relatively rapid change in angle of attack is required in order to take advantage of dynamic lift overshoot, various control surfaces, including control surfaces located on the forward part of the aircraft can be used. Propellers and/or jet engines can be used for propulsion, and thrust vectoring can be utilized.

Still other modifications may be made to the apparatus and method described above without departing from the scope of the invention as defined in the following claims.

The invention claimed is:

1. A method for reducing the runway length requirement for the take-off, or landing, of an aircraft comprising a wing, in which lift is generated by flow of air over said wing, the method being carried out while the aircraft is taking off, or landing, and comprising increasing the aerodynamic lift coefficient of the aircraft to a level exceeding the steady flow stall value, whereby the aerodynamic lift coefficient of the aircraft exceeds the maximum lift coefficient predicted by the steady flow lift curve for said aircraft.

2. The method according to claim 1, in which the step of increasing the aerodynamic lift coefficient of the aircraft to a level exceeding the steady flow stall value is carried out by increasing the angle of attack of said wing.

3. The method according to claim 1, in which said aircraft comprises a wing with a flap, and in which the step of increasing the aerodynamic lift coefficient of the aircraft to a level exceeding the steady flow stall value is carried out at least in part by increasing the flap angle.

4. The method according to claim 1, in which said aircraft comprises a wing with a flap, and in which the step of increasing the aerodynamic lift coefficient of the aircraft to a level exceeding the steady flow stall value is carried out in part by increasing the angle of attack of said wing, and in part by increasing the flap angle.

5. The method according to claim 1, in which the step of increasing the aerodynamic lift coefficient of the aircraft to a level exceeding the steady flow stall value is carried out by increasing the angle of attack of said wing at controlled time rates of change.

6. The method according to claim 1, in which said aircraft comprises a wing with a flap, and in which the step of increasing the aerodynamic lift coefficient of the aircraft to a level exceeding the steady flow stall value is carried out, at least in part by increasing the flap angle at controlled time rates of change.

7. The method according to claim 1, in which the step of increasing the aerodynamic lift coefficient of the aircraft to a level exceeding the steady flow stall value is carried out at least in part, by increasing the angle of attack of said wing at controlled time rates of change.

8. The method according to claim 1, in which said aircraft comprises a flap, and in which the step of increasing the aerodynamic lift coefficient of the aircraft to a level exceeding the steady flow stall value is carried out, at least in part, by increasing the flap angle at controlled time rates of change.

9. The method according to claim 1, in which said aircraft comprises a wing with a flap, and in which the step of increasing the aerodynamic lift coefficient of the aircraft to a level exceeding the steady flow stall value is carried out in part by increasing the angle of attack of said wing at controlled time rates of change, and in part by increasing the flap angle at controlled time rates of change.

10. The method according to claim 1, in which said lift coefficient-increasing step is carried out during take-off.

11. The method according to claim 1, in which said lift coefficient-increasing step is carried out during landing.

12. The method according to claim 1, in which, while the aerodynamic lift coefficient of the aircraft exceeds the steady flow stall value, vortex energizers on board the aircraft are activated to strengthen vortex flow of air over the wing and thereby delay the onset of stall.

13. The method according to claim 1, including the step of automatically sensing the onset of stall by means of sensors arranged to sense attitude and acceleration of the aircraft, and in which the aerodynamic lift coefficient of the aircraft is decreased, from said level exceeding the steady flow stall value, to a level below the stall value in response to a signal provided by said sensors.

14. The method according to claim 13, in which the aerodynamic lift coefficient of the aircraft is decreased, from said level exceeding the stall value, to a level below the stall value, by actuation of a control surface in response to said signal provided by said sensors.

15. The method according to claim 1, including the steps of automatically sensing attitude and accelerations of the aircraft by means of sensors, predicting the onset of stall by means of an on-board computer responsive to said sensors, and in which the aerodynamic lift coefficient of the aircraft is decreased, from said level exceeding the steady flow stall value, to a level below the steady flow stall value in response to a signal provided by said computer.

16. The method according to claim 1, in which said aircraft is a lifting body.

17. The method according to claim 1, in which the body of said aircraft has a delta-shaped planform, a narrow nose, and a wide trailing edge, substantially the entire body of the aircraft serving as an airfoil.

18. The method according to claim 1, in which, while the aircraft is taking off or landing, the angle of attack of said wing is increased at a rate sufficient to cause the aerodynamic lift coefficient of the aircraft to exceed the maximum lift coefficient predicted by the steady flow lift curve for said aircraft.

19. A method for reducing the runway length requirement for the take-off of an aircraft comprising a wing in which lift is generated by flow of air over said wing, the method comprising the steps of:

during take-off, generating lift by causing the aircraft to accelerate to take-off speed while maintaining the aerodynamic lift coefficient at a level below the steady flow stall value;

thereafter increasing the aerodynamic lift coefficient to a level exceeding the steady flow stall value;

causing the aircraft to climb while the aerodynamic lift coefficient exceeds the steady flow stall value; and during said climb, decreasing the aerodynamic lift coefficient to a level below the steady flow stall value before loss of control occurs.

20. A method for reducing the runway length requirement for the landing of an aircraft comprising a wing in which lift is generated by flow of air over said wing, the method comprising the steps of:

during approach to landing, maintaining the aerodynamic lift coefficient of the aircraft at a level below the steady flow stall value; and thereafter, increasing the aerodynamic lift coefficient to a level exceeding the steady flow stall value.

21. The method according to claim 20, in which, after increasing the aerodynamic lift coefficient to a level exceeding the steady flow stall value, but preceding touchdown, continued controlled flight and deceleration of the aircraft takes place while the aircraft is in a dynamic stall.

* * * * *